(12) United States Patent
Banerjea

(10) Patent No.: US 8,565,325 B1
(45) Date of Patent: Oct. 22, 2013

(54) WIRELESS DEVICE COMMUNICATION IN THE 60GHZ BAND

(75) Inventor: Raja Banerjea, Sunnyvale, CA (US)

(73) Assignee: Marvell International Ltd., Hamilton (BM)

(*) Notice: Subject to any disclaimer, the term of this patent is extended or adjusted under 35 U.S.C. 154(b) by 614 days.

(21) Appl. No.: 12/397,057

(22) Filed: Mar. 3, 2009

Related U.S. Application Data

(60) Provisional application No. 61/037,525, filed on Mar. 18, 2008.

(51) Int. Cl.
*H04K 1/10* (2006.01)

(52) U.S. Cl.
USPC .......... 375/260; 375/267; 375/299; 375/347; 375/349

(58) Field of Classification Search
USPC .................. 375/260, 267, 299, 347, 349
See application file for complete search history.

(56) References Cited

U.S. PATENT DOCUMENTS

| | | | |
|---|---|---|---|
| 4,449,190 A | 5/1984 | Flanagan et al. |
| 5,245,704 A | 9/1993 | Weber et al. |
| 5,623,474 A | 4/1997 | Oshio et al. |
| 5,778,029 A | 7/1998 | Kaufman |
| 6,031,628 A | 2/2000 | Jacob et al. |
| 6,255,906 B1 | 7/2001 | Eidson et al. |
| 6,266,517 B1 | 7/2001 | Fitzpatrick et al. |
| 6,275,685 B1 | 8/2001 | Wessel et al. |
| 6,639,944 B1 | 10/2003 | De Haan et al. |
| 6,667,659 B2 | 12/2003 | Stengel et al. |
| 6,731,406 B1 | 5/2004 | Ganapathy et al. |
| 6,912,249 B2 | 6/2005 | Haartsen |
| 6,950,469 B2 | 9/2005 | Karczewicz et al. |
| 6,983,026 B2 | 1/2006 | Pinckley et al. |
| 7,023,941 B1 | 4/2006 | Rey et al. |
| 7,262,722 B1 | 8/2007 | Jahanghir et al. |
| 7,362,818 B1 | 4/2008 | Smith et al. |
| 7,418,057 B2 | 8/2008 | Shako et al. |
| 7,447,274 B2 | 11/2008 | Shako et al. |
| 7,450,641 B2 | 11/2008 | Sun et al. |
| 7,466,762 B2 | 12/2008 | Shako et al. |
| 7,599,431 B1 | 10/2009 | Anderson et al. |
| 7,675,886 B2 | 3/2010 | Agrawal et al. |
| 7,702,020 B2 | 4/2010 | Gallant et al. |
| 7,706,475 B1 | 4/2010 | Koikare et al. |
| 7,782,973 B2 | 8/2010 | Kim et al. |
| 7,822,147 B2 | 10/2010 | Huang et al. |
| 8,014,737 B2 | 9/2011 | Pratt et al. |
| 8,160,150 B2 | 4/2012 | Moore |
| 8,498,342 B1 | 7/2013 | Sha et al. |
| 8,520,771 B1 | 8/2013 | Brunn et al. |

(Continued)

OTHER PUBLICATIONS

"Non-Final Office Action", U.S. Appl. No. 12/269,744, (Aug. 18, 2011), 10 pages.

(Continued)

*Primary Examiner* — Kabir A Timory

(57) ABSTRACT

In one or more embodiments, system(s), method(s), integrated circuit(s), physical layer(s), apparatus(es), System-on-Chip (SoC), various other hardware, computer-readable and/or executable instructions, and/or technique(s) are described that enable lower power consumption and/or maximize channel utilization for devices communicating wirelessly in the 60 GHz range. These embodiments enable handheld devices to use less power when communicating with wall-powered or other higher-powered devices while still enabling the wall-powered devices to communicate effectively with each other by maximizing channel utilization.

18 Claims, 4 Drawing Sheets

(56) References Cited

U.S. PATENT DOCUMENTS

| | | |
|---|---|---|
| 2002/0067773 A1 | 6/2002 | Jackson et al. |
| 2002/0072346 A1 | 6/2002 | Kato et al. |
| 2003/0164736 A1 | 9/2003 | Stengel et al. |
| 2003/0179831 A1 | 9/2003 | Gupta et al. |
| 2004/0090909 A1 | 5/2004 | Khlat |
| 2004/0232984 A1 | 11/2004 | Meade et al. |
| 2005/0018519 A1 | 1/2005 | Nii |
| 2005/0213661 A1 | 9/2005 | Xiang et al. |
| 2005/0231292 A1 | 10/2005 | Akahori et al. |
| 2005/0243946 A1 | 11/2005 | Chung et al. |
| 2006/0126962 A1 | 6/2006 | Sun |
| 2006/0174236 A1 | 8/2006 | Stein et al. |
| 2006/0227895 A1 | 10/2006 | Booth et al. |
| 2007/0025448 A1 | 2/2007 | Cha et al. |
| 2007/0086528 A1 | 4/2007 | Mauchly et al. |
| 2007/0118791 A1 | 5/2007 | Hepler et al. |
| 2007/0135065 A1 | 6/2007 | Leffel et al. |
| 2007/0241812 A1 | 10/2007 | Yang et al. |
| 2008/0031376 A1* | 2/2008 | Ban .................. 375/271 |
| 2008/0049709 A1 | 2/2008 | Pan et al. |
| 2008/0074289 A1* | 3/2008 | Sauder et al. .......... 340/909 |
| 2008/0094280 A1 | 4/2008 | Fenton |
| 2008/0219373 A1 | 9/2008 | Zhang et al. |
| 2008/0270344 A1 | 10/2008 | Yurick et al. |
| 2009/0097533 A1* | 4/2009 | Lakkis .................. 375/146 |
| 2009/0103622 A1 | 4/2009 | Tripathi et al. |
| 2009/0181622 A1* | 7/2009 | Hardacker .............. 455/73 |
| 2009/0213946 A1 | 8/2009 | Dick et al. |
| 2009/0257526 A1 | 10/2009 | Wang et al. |
| 2009/0310704 A1 | 12/2009 | Jethanandani et al. |
| 2010/0035554 A1 | 2/2010 | Ba et al. |
| 2010/0135257 A1 | 6/2010 | Higuchi et al. |
| 2010/0239034 A1 | 9/2010 | Lee et al. |
| 2011/0013730 A1 | 1/2011 | Mansson et al. |

OTHER PUBLICATIONS

"Restriction Requirement", U.S. Appl. No. 12/269,744, (Jun. 22, 2011), 6 pages.

Mujtaba, Syed A., "TGn Sync Proposal Technical Specification", *IEEE 802.11-04 / Wireless LANs*, (May 2005), pp. 1-131.

Zhang, Hongyuan et al., "U.S. Appl. No. 12/098,222", (Apr. 4, 2008), 78 pages.

"Non-Final Office Action", U.S. Appl. No. 12/510,716, (Nov. 8, 2011), 8 pages.

"Non-Final Office Action", U.S. Appl. No. 12/511,606, (Jan. 4, 2012), 6 pages.

"Final Office Action", U.S. Appl. No. 12/510,716, (Jun. 28, 2012), 10 pages.

"Non-Final Office Action", U.S. Appl. No. 12/253,078, (Jun. 8, 2012), 18 pages.

"Non-Final Office Action", U.S. Appl. No. 12/574,879, (Jun. 4, 2012), 11 pages.

"Non-Final Office Action", U.S. Appl. No. 12/269,744, (Feb. 16, 2012), 14 pages.

"Non-Final Office Action", U.S. Appl. No. 12/511,629, (Apr. 13, 2012), 6 pages.

"Final Office Action", U.S. Appl. No. 12/269,744, Sep. 19, 2012, 13 pages.

"Final Office Action", U.S. Appl. No. 12/511,606, Sep. 13, 2012, 8 pages.

"Non-Final Office Action", U.S. Appl. No. 12/767,922, Nov. 2, 2012, 12 pages.

"Final Office Action", U.S. Appl. No. 12/574,879, Nov. 20, 2012, 13 pages.

"Final Office Action", U.S. Appl. No. 12/253,078, Feb. 13, 2013, 21 pages.

"Final Office Action", U.S. Appl. No. 12/511,629, Dec. 7, 2012, 7 pages.

"Non-Final Office Action", U.S. Appl. No. 12/574,879, Apr. 23, 2013, 13 pages.

"Notice of Allowance", U.S. Appl. No. 12/269,744, Apr. 10, 2013, 11 pages.

"Notice of Allowance", U.S. Appl. No. 12/767,922, Apr. 16, 2013, 5 pages.

"Notice of Allowance", U.S. Appl. No. 12/511,629, Mar. 28, 2013, 7 pages.

"Non-Final Office Action", U.S. Appl. No. 13/182,004, May 21, 2013, 9 pages.

"Supplemental Notice of Allowance", U.S. Appl. No. 12/269,744, May 20, 2013, 8 pages.

"Supplemental Notice of Allowance", U.S. Appl. No. 12/269,744, Jul. 1, 2013, 8 pages.

* cited by examiner

WIRELESS DEVICE COMMUNICATION IN THE 60GHZ BAND

RELATED APPLICATION

This application claims priority to U.S. Provisional Patent Application Ser. No. 61/037,525 filed Mar. 18, 2008, the disclosure of which is incorporated by reference herein in its entirety.

BACKGROUND

Current devices that communicate wirelessly using radio frequencies, such as some handheld computing devices, laptop computers, televisions, desktop computers, and set-top boxes, often have very low efficiencies in the 60 GHz band. In many cases the efficiency of current devices operating in this band is as low as ten percent.

Devices that communicate wirelessly typically transmit information using single-carrier modulation or orthogonal frequency division multiplexing (OFDM) modulation. A single-carrier system modulates information onto one carrier using frequency, phase, or amplitude adjustment of the carrier. OFDM modulation is a frequency division multiplexing scheme that extends the concept of single carrier modulation by using multiple, orthogonal subcarriers to carry information. OFDM modulation, unlike single-carrier modulation, permits use of beam forming to overcome channel-path loss common to the 60 GHz band. However, devices that implement OFDM modulation consume more power relative to devices that implement single-carrier modulation.

SUMMARY

This Summary is provided to introduce a selection of concepts in a simplified form that are further described below in the Detailed Description.

A method embodiment is described for transmitting and receiving signals in a wireless device. The method receives a signal that has been modulated in accordance with a single-carrier modulation scheme or an orthogonal frequency division multiplexing (OFDM) modulation scheme. In response to the signal having been modulated in accordance with the single-carrier modulation scheme, the method demodulates the signal through a single-carrier demodulator of the wireless device. In response to the signal having been modulated in accordance with the orthogonal frequency division multiplexing (OFDM) modulation scheme, the method demodulates the signal through an orthogonal frequency division multiplexing (OFDM) demodulator of the wireless device.

In a wireless device embodiment, the wireless device includes a receiver to receive a signal that has been modulated in accordance with a single-carrier modulation scheme or an orthogonal frequency division multiplexing (OFDM) modulation scheme. The wireless device also includes a single-carrier demodulator to demodulate a received signal that has been modulated in accordance with the single-carrier modulation scheme. An orthogonal frequency division multiplexing (OFDM) demodulator is also included in the wireless device. This OFDM demodulator is capable of demodulating a received signal that has been modulated in accordance with the orthogonal frequency division multiplexing (OFDM) modulation scheme.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
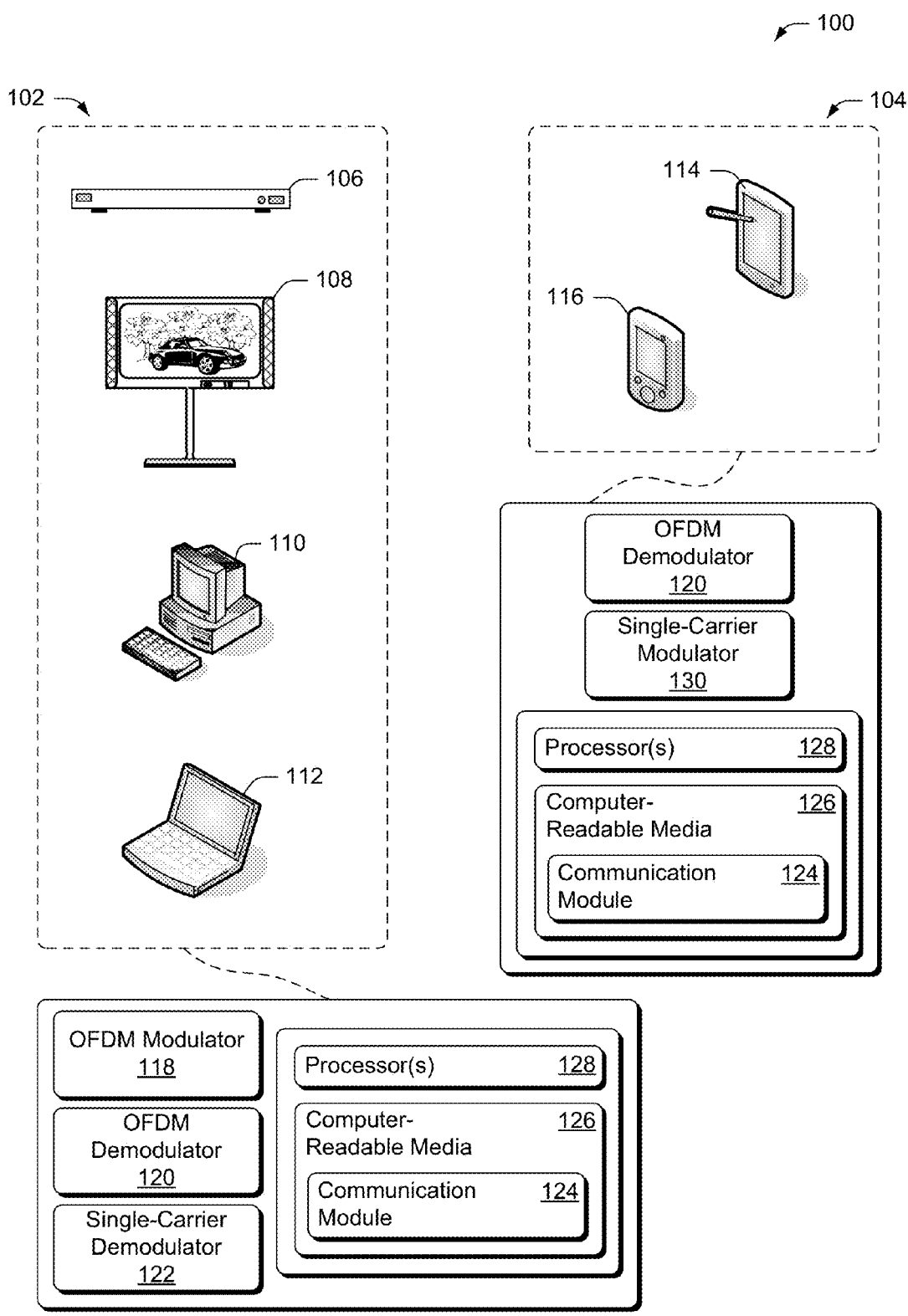
FIG. 1 is an illustration of an example operating environment that is configured to enable wireless device communication in the 60 GHz band.

As noted in the Background above, many current devices operating in the 60 GHz band use significant amounts of power or struggle with single-carrier problems. Using too much power is especially problematic for many devices relying on batteries, such as handheld computing devices (e.g., cellular phones). Many handheld devices simply cannot operate in the 60 GHz band without draining their batteries too quickly if they use OFDM modulation to overcome inefficiencies in this band. Handheld devices may instead implement single-carrier modulation, though this technique is difficult to adapt to beam forming and has other challenges as well.

Wall-powered devices do not have the same power constraints as handheld devices and may, therefore, rely on OFDM modulation techniques to communicate information. Wall-powered devices are those that do not have significant power constraints, such as those that are plugged into a typical outlet or have powerful batteries. Handheld devices are those that do have power constraints, which are described in greater detail below.

In many applications, wall-powered devices often communicate with handheld devices. For example, a handheld cellular phone may sync email wirelessly with a desktop computer. Or a laptop computer powered by a battery may transfer a large file, such as a movie, to a set top box or television. Further still in other applications, two wall-powered devices may communicate with each other, such as a set top box and a television or other display device. Also, in some other applications, two hand-held devices may also communicate with each other.

If each of these devices is to communicate effectively with any other of these devices in the 60 GHz band, however, neither of these modulation techniques—single carrier or OFDM—is especially effective on its own. If all of the devices use OFDM modulation, for example, the handheld devices will use too much power. If all of the devices use single-carrier modulation, the handheld devices will consume less power, but communication efficiency will be less effective relative to devices that communicate using OFDM modulation.

The present specification describes tools that enable lower power consumption and/or maximize channel utilization for devices communicating wirelessly in the 60 GHz range. These tools may include apparatuses having hardware, such as physical layers, and software that enable handheld devices to use less power when communicating with wall-powered or other higher-powered devices while still enabling the wall-powered devices to communicate with each other by maximizing channel utilization through various modulation schemes.

In the discussion that follows, an example operating environment is described that may incorporate, represent, or be used by the tools. The tools may include the example modulator(s), demodulator(s), and module(s) described in this environment of FIG. 1. Example procedures are also described that may be employed in the example operating environment as well as other environments. These procedures are followed by an example System-on-Chip (SoC) embodiment in which components of FIG. 1 may be embodied. In the discussion below, reference will be made to the environment by way of example only. Therefore, implementation of the tools is not limited to the example environment. The term "tools" as used herein may refer to system(s), method(s), integrated circuit(s), apparatus(es), physical layer(s), SoCs, various other hardware, computer-readable and/or executable instructions, and/or technique(s) as permitted by the context above and throughout the document.

Example Operating Environment

Before describing the tools in detail, the following discussion of an example operating environment is provided to assist the reader in understanding some ways in which various aspects of the tools may be, but are not required to be, employed. The environment described below constitutes one example; other environments may be used without departing from the scope of the claimed subject matter.

FIG. 1 illustrates one such operating environment generally at 100. The example operating environment includes high-power computing devices 102 and low-power computing devices 104. The high-power devices include a set-top box 106, a television or other display 108, a desktop computing device 110, and a laptop computing device 112. The low-power devices include a personal digital assistant (PDA) 114 and a cellular phone 116. Each of these devices is a wireless-communication-enabled device that may communicate wirelessly with any one of the other devices in a high frequency band—e.g., the sixty Giga-Hertz (60 GHz) band.

High-power devices, such as wall-powered devices or in some cases those having high-power capabilities using one or more batteries (such as some laptop computing devices), are those that do not have significant power constraints with regard to communicating in the 60 GHz band and can use beam-forming techniques to transmit data to other devices. Low-power devices, such as handheld devices with limited battery power and some laptop or similar devices (especially if those laptop or similar devices have batteries that are not fully charged or are otherwise drained), are those that have low-power capabilities and thus may have power constraints with regard to communicating in the 60 GHz band using beam-forming techniques.

In this example environment, each of the high-power devices includes an OFDM modulator 118, an OFDM demodulator 120, and a single-carrier demodulator 122. The OFDM modulator 118 is capable of transmitting radio-frequency signals in the 60 GHz band by modulating carrier sub-signals using Quadrature Amplitude Modulation (QAM) and transmitting those signals. As noted above, OFDM modulation (and transmission) can require significant amounts of energy, which causes challenges for battery-powered and other low-power devices. Special cases in which laptop 112 may be considered a low-power device or handled differently than some other high-power devices are considered elsewhere in this document.

The OFDM demodulator 120 is capable of demodulating transmitted radio-frequency signals in the 60 GHz band by receiving the signals, quadrature-mixing down the signals to a baseband using cosine and sine waves at the carrier frequency of 60 GHz, and then using analog-to-digital converters and a forward Fast Fourier Transform (FFT) to convert back to the frequency domain. Note that this is one example of many contemplated manners in which to modulate, transmit, receive, and demodulate signals in the 60 GHz band. Other manners may also be used herein.

The single-carrier demodulator 122 is capable of demodulating transmitted radio-frequency signals in the 60 GHz band by receiving the signals, demodulating the signals according to the scheme used to modulate the signals (such as Gaussian Frequency Shift Keying, GFSK), and providing the data from these received signals.

Both the high-power and low-power devices include a communication module 124. The communication module 124 may operate in software, firmware, hardware or a combination of these, and may be integral with or separate from any one of the OFDM modulator 118, OFDM demodulator 120, or single-carrier demodulator 122 (or the single-carrier modulator 122 when included in a low-power device 104). The communication module 124 may also act as or work in conjunction with a Point Network Controller (PNC) (not shown). In any case, a communication module of at least one of any two devices in communication controls that communication or gives instruction to have that communication controlled in a particular manner. In this example embodiment, the communication module 124 is separate from the illustrated modulators and demodulators and is stored on one or more computer-readable media 126 and is executable as computer-executable instructions on one or more processors 128.

The communication module 124 is capable of making decisions and performing one or more tasks effective to enable devices having various power constraints to communicate effectively or at lower power. Manners in which the communication module 124 may do so are set forth in the section entitled "Example Processes" below, as well as elsewhere herein.

FIG. 1 also illustrates that each of the low-power devices 104 includes a single-carrier modulator 130 and OFDM demodulator 120, as well as a corresponding communication module 124, computer-readable media 126, and processor(s) 128 described above. The single-carrier modulator 130 is capable of modulating radio-frequency signals in the 60 GHz band according to a single-carrier scheme and transmitting those modulated signals. One example single-carrier scheme is frequency-division multiple-access modulation, though others modulation techniques may also be used. If communication between two low-power (e.g., handheld, battery-powered) devices is desired, each of the handheld devices may also include single-carrier demodulator 122 (shown only for high-power devices 102 in FIG. 1).

The procedures, here including or acting through modulator(s), demodulator(s), and communication module(s) of these devices enable dual modes of communication between a high-power and low-power device, one mode using single-carrier techniques and a second mode using OFDM techniques, and without requiring an OFDM modulator. As will be described in greater detail below, the procedures in this environment may include or act through each of these entities—the modulator(s), the demodulator(s), and the communication module(s).

Note that the high-power devices 102 do not include a single-carrier modulator and the low-power devices 104 do not include an OFDM modulator (and in some cases a single-carrier demodulator). By so configuring the devices, space in a device and cost in producing the device may be reduced. Note also that by so configuring the devices, the low-power devices 104 may transmit at relatively low power by using a single-carrier modulator. The low-power devices 104 may also receive data at higher rates than typically found with a single-carrier signal and still at low power using the OFDM demodulator 120. Demodulating OFDM signals is not expensive energy-wise, rather, the modulation of the OFDM signals by an OFDM modulator 118 is the side of the operation that is expensive energy-wise. Manners in which the devices act to communicate are discussed in the Example Procedures section below, including through each of their respective communication modules.

Example Procedures

The following discussion describes techniques that may be implemented utilizing the previously described environment. Aspects of the procedure may be implemented in hardware, firmware, software, or a combination thereof. The procedures are shown as a set of blocks that specify operations performed by one or more entities and are not necessarily limited to the orders shown for performing the operations by the respective blocks.

Figure 2:
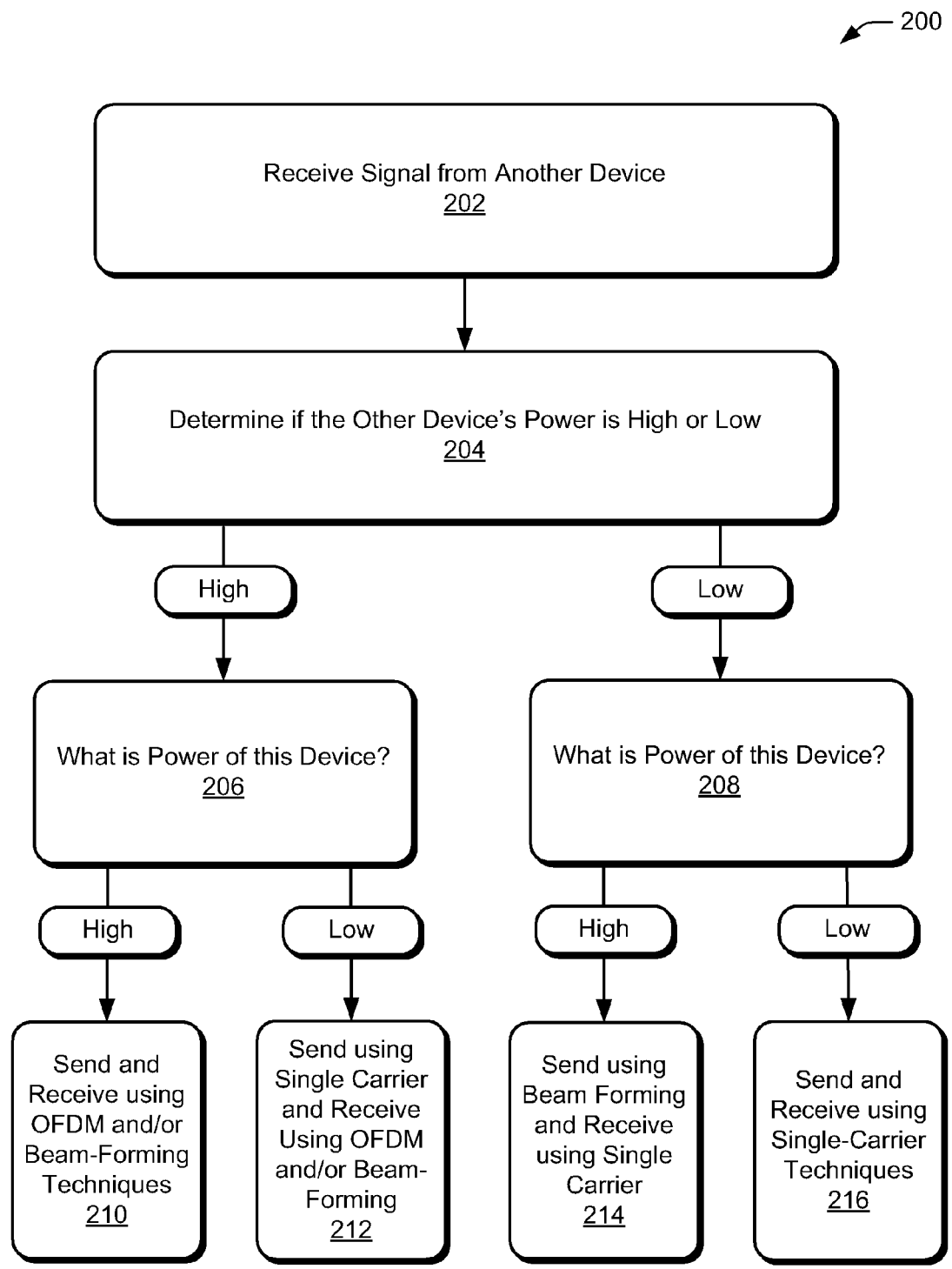
FIG. 2 is a flow diagram that depicts an example procedure in which tools enable wireless device communication in the 60 GHz band.

FIG. 2 depicts a procedure 200 in an example implementation in which the tools enable wireless device communication in a high frequency band—e.g., the 60 GHz band.

A first wireless-communication-enabled device receives one or more signals from a second wireless-communication-enabled device (block 202). In one implementation, the signals include information sufficient for the first wireless-communication-enabled device to determine a high-power or low-power capability of the second wireless-communication-enabled device. Example wireless-communication-enable devices include high-power devices 102 and low-power devices 104 of FIG. 1. The signals may include information or by the signals' nature indicate information about the second wireless-communication-enabled device.

At block 204, the first wireless-communication-enabled device determines, based on information about or contained in the signals, that the second wireless-communication-enabled device has the high-power capability or the low-power capability. As noted above, this high-power capability indicates that the device is capable of modulating and transmitting signals in the 60 GHz band without concerns about significantly reducing the power reserves of the device. Example devices that are high-power include those of FIG. 1, such as wall-powered devices and devices having significant battery power, such as some laptop computers.

This information about the power capabilities of the device may be included within the signals, such that the signals, once demodulated, may contain data about the device and its power capabilities. This information may also be determined based on the signal itself, such as if the signal is modulated according to the single-carrier modulation scheme and in the 60 GHz band. In this case the signal may be interpreted to mean that the device does not have high-power capabilities, as single-carrier modulation is a lower-power option in transmitting signals in the 60 GHz band. Similarly, if the signals are modulated using a beam-forming technique and in the 60 GHz band, the tools (e.g., one or both communication modules 124) may determine the device to be high power as modulating in this manner may require higher-powered capabilities.

If at block 204 the first wireless-communication-enabled device determines that the second device is high-powered, the procedure 200 proceeds along the "High" path to block 206. If at block 204 the first wireless-communication-enabled device determines that the second wireless-communication-enabled device is low-powered, the procedure 200 proceeds along the "Low" path to block 208.

At block 206 and block 208, a determination is made of the power mode (or capability) of the first wireless-communication-enabled device (i.e., the device that received the signals at block 202). In one implementation, the power mode of a given wireless-communication-enabled device may be preset or programmed.

The procedure 200 proceeds responsive to the determination at block 204 and based on the capabilities of the first device and the second device. At block 210 along another "High" path, the first and second wireless-communication-enabled devices transmit and receive, or prepare to receive radio-frequency signals in the 60 GHz band using one or more beam-forming techniques. Thus, if the first wireless-communication-enabled device and the second wireless-communication-enabled device are both high-powered, the devices may both communicate with each other using more-power-intensive techniques, such as beam forming. These beam forming techniques may include Orthogonal Frequency-Division Multiplexing (OFDM), which may in turn modulate carrier sub-signals using Quadrature Amplitude Modulation (QAM).

If the power capability of the first wireless-communication-enabled device is low, the procedure 200 proceeds along a "Low" path to block 212. At block 212, the first wireless-communication-enabled device transmits radio-frequency signals in the 60 GHz band modulated according to a single-carrier modulation scheme and receives, or prepares to receive, radio-frequency signals in the 60 GHz band using the one or more beam-forming techniques (and/or OFDM). Thus, if the first wireless-communication-enabled device is low-powered, such as a cellular phone, and the second wireless-communication-enabled device is high-powered, such as a desktop computer, the procedure 200 enables the low-powered device to receive signals modulated with beam-forming techniques and transmit signals to the desktop computer using a single-carrier modulation scheme. This acts to permit effective reception of data via beam forming and low-power transmission using single-carrier modulation.

Conversely, if at block 204 the first wireless-communication-enabled device determines that the second wireless-communication-enabled device has low-power capabilities, the procedure 200 proceeds along the "Low" path to block 208. The procedure 200 proceeds based on the capabilities of the first wireless-communication-enabled device and the second wireless-communication-enabled device. Therefore, if the first wireless-communication-enabled device is a high powered device, at block 214 and through another "High" path, the first wireless-communication-enabled device transmits radio-frequency signals in the 60 GHz band using the one or more beam-forming techniques and receives, or prepares to receive, radio-frequency signals in the 60 GHz band modulated according to a single-carrier modulation scheme.

If the power capability of the first wireless-communication-enabled device is instead low, the procedure 200 proceeds along a "Low" path to block 216. At block 216, the first wireless-communication-enabled device transmits and receives radio-frequency signals in the 60 GHz band according to a single-carrier modulation scheme. Thus, if the first wireless-communication-enabled device is low-powered, such as a cellular phone, and the second wireless-communication-enabled device is low-powered, such as a PDA or other cellular phone, the procedure 200 enables the low-powered devices to transmit and receive signals using low-power single-carrier modulation and demodulation. The single-carrier scheme may include a Gaussian Frequency Shift Keying (GFSK) scheme, though others may also be used.

Note that the tools may operate through either or both communication modules (in each of the two devices for which communication is desired). Thus, the communication module of a high-power device may indicate to the other device (whether high- or low-powered) that the communication module of the high-power device will control network communications. This communication module may then communicate with the other device (through the other device's communication module or otherwise) indicating the type of communication that the other device should expect. For example, if both devices are high-powered, one of the communication modules may tell the other communication module to prepare to receive radio-frequency transmissions in the 60 GHz band that are modulated according to a beam-forming technique. This communication module may also request that beam-forming be used when sending from the other device to this device. Further still, the communication module that is in control may switch its device's demodulators—from OFDM demodulator 120 to single-carrier demodulator 122 if receiving from a low-power device or from single-carrier demodulator 122 to OFDM demodulator 120 if receiving from a high-power device. In this example, the communication module that controls network communications may act in conjunction with or as a Point Network Controller (PNC).

Note also that the non-controlling communication device may receive this information or instruction from the controlling communication device and react accordingly. If a device has two demodulators, this may include preparing to receive signals with a beam-forming demodulator or a single-carrier demodulator. Doing so may include switching power from one modulator to the other so as to power only one of the demodulators.

In the case of two low-powered devices, one of the communication modules may take control and both transmit and receive using a single-carrier modulation scheme. In this case, the low-power devices may both include single-carrier demodulators, in which case both will switch or otherwise prepare to demodulate using the single-carrier demodulator 122 rather than OFDM demodulator 120.

Figure 3:
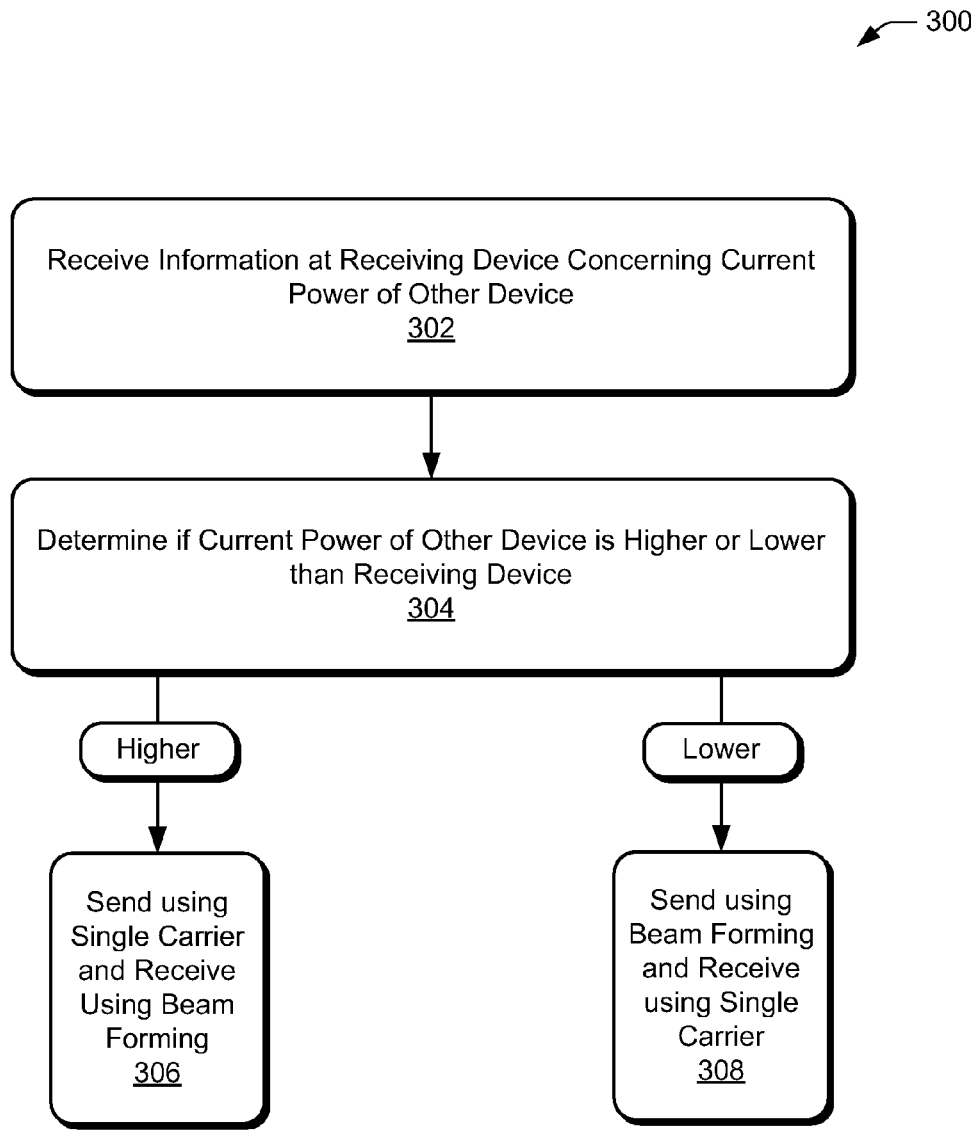
FIG. 3 is a flow diagram that depicts an example procedure in which the tools enable wireless device communication in the 60 GHz band for devices having power constraints when modulating radio-frequency signals in the 60 GHz band with a beam-forming technique.

FIG. 3 depicts another procedure 300 that enables wireless device communication in the 60 GHz band for devices having power constraints in modulating radio-frequency signals in the 60 GHz band with a beam-forming technique.

At block 302, a first wireless-communication-enabled device operating with power constraints receives one or more signals from a second wireless-communication-enabled device also operating with power constraints. In one implementation, the signals include information sufficient to determine a current power of the second wireless-communication-enabled device. Example wireless-communication-enable devices having power constraints include low-power devices 104 as well as high-power devices 102 that are not wall-powered, such as battery-powered laptop computing devices. As noted above, the information may be included in the signals or otherwise.

At block 304, the first wireless-communication-enabled device determines, based on the information, that a current power of the second wireless-communication-enabled device is less than a current power of the first wireless-communication-enabled device or that the current power of the second wireless-communication-enabled device is more than the current power of the first wireless-communication-enabled device. Note that the current power of either device may be an absolute measure of power or may be a relative capability of each device or a measure of the ability of the first and second wireless-communication-enabled device to successfully transmit signals in the 60 GHz range using the beam-forming technique.

The power constraint may indicate that each device is operating with one or more batteries and without direct access to a wall or similar non-power-constrained power source, for example, such as if one is a laptop computing device and one is a cellular phone that are not plugged in.

Responsive to the determination at block 304, the procedure 300 proceeds along a "Higher" path to block 306 if the current power of the other device (the second wireless-communication-enabled device) is higher than that of the receiving device (the first wireless-communication-enabled device).

At block 306, the first wireless-communication-enabled device wirelessly communicates with the second wireless-communication-enabled device by transmitting radio-frequency signals in the 60 GHz band modulated according to a single-carrier modulation scheme and preparing or continuing to receive radio-frequency signals in the 60 GHz band using a beam-forming technique.

Conversely, responsive to the determination at block 304, the procedure 300 proceeds along a "Lower" path to block 308 if the current power of the other device (the second wireless-communication-enabled device) is lower than that of the receiving device (the first wireless-communication-enabled device).

At block 308, the first wireless-communication-enabled device wirelessly communicates with the second wireless-communication-enabled device by transmitting radio-frequency signals in the 60 GHz band using a beam-forming technique and preparing or continuing to receive radio-frequency signals in the 60 GHz band modulated according to a single-carrier modulation scheme.

Note that preparing or continuing to receive radio-frequency signals in the 60 GHz band modulated according to a single-carrier modulation scheme may in some cases comprise switching from actively receiving signals modulated according to Orthogonal Frequency-Division Multiplexing (OFDM) to the radio-frequency signals in the 60 GHz band modulated according to the single-carrier modulation scheme. This act of switching may switch from active use of an OFDM demodulator in the first wireless-communication-enabled device to active use of a single-carrier demodulator in the first wireless-communication-enabled device. The procedures may also act to determine that both devices will transmit and receive using single-carrier techniques due to power constraints on both devices.

The procedures described above enable a device having lower power to save energy by transmitting using a single-carrier modulation scheme and efficiently receive information using a beam-forming modulation scheme. As noted above, the procedures may be implemented by one or more communication modules. In one implementation, the higher-powered device's communication module may take control of the communications between the two devices and provide instructions as noted in procedure 200. These instructions may be received by the lower-powered device similarly to a device not in control and/or a low-power device also as described for procedure 200 above.

The controlling communication module may then receive radio-frequency signals in the 60 GHz band modulated according to the single-carrier modulation scheme and demodulate the received signals according to the single-carrier scheme used to modulate the received signals effective to provide demodulated received signals, thereby providing the data modulated in the signals to the first device.

The modulation schemes used herein may be those appreciated by one skilled in the art of 60 GHz communication, such as single-carrier GFSK or OFDM.

System-on-Chip Example

Figure 4:
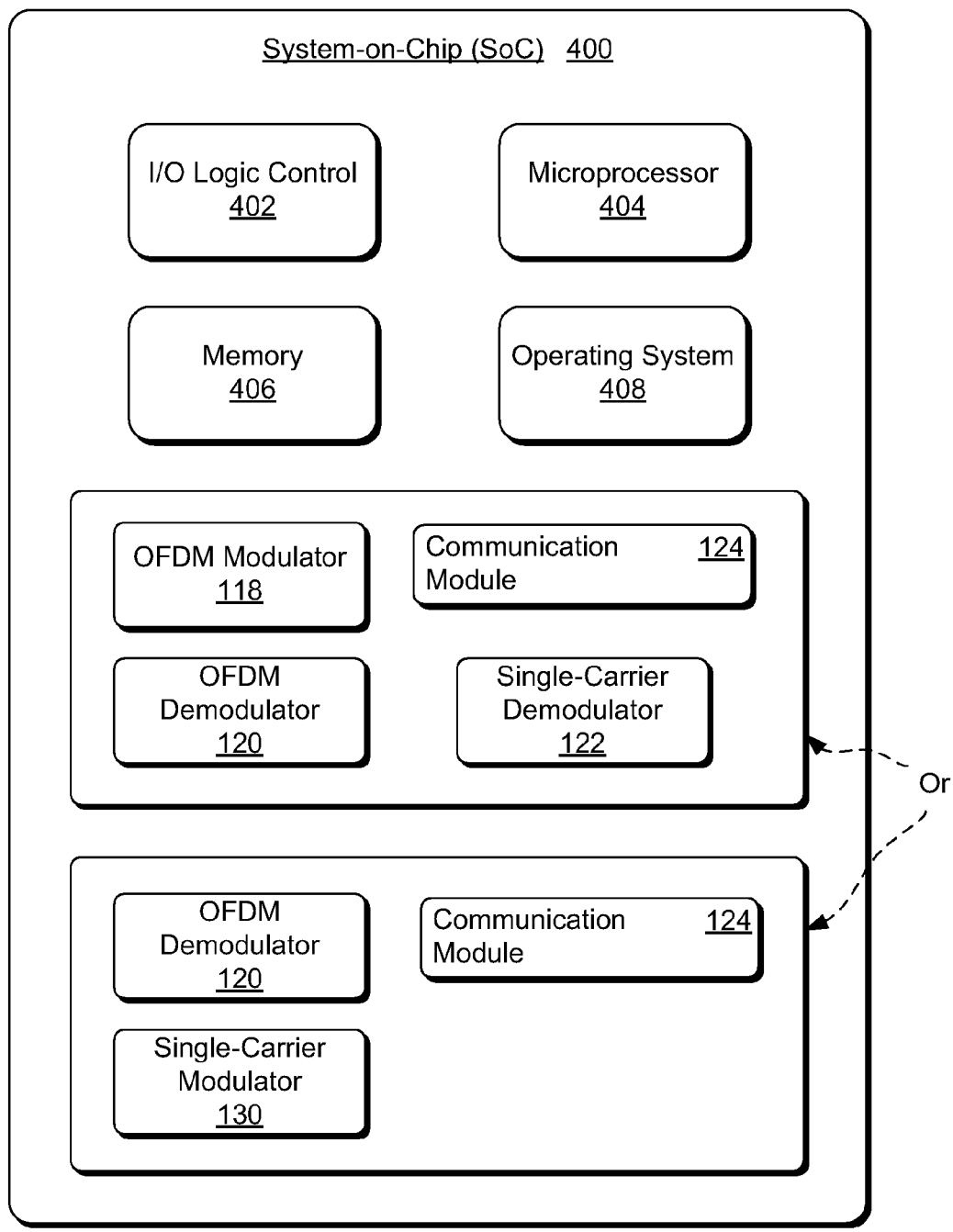
FIG. 4 illustrates an example system-on-chip (SoC) environment in which embodiments of the tools can be implemented.

FIG. 4 illustrates an example System-on-Chip (SoC) 400, which can implement various embodiments of the tools in many types of wireless devices. An SoC can be implemented in a fixed or mobile device, such as any one or combination of a media device, computer device, television set-top box, video processing and/or rendering device, appliance device, gaming device, electronic device, vehicle, workstation, and/or in any other type of device that may communicate wirelessly in a high frequency band—e.g., the 60 GHz band.

The SoC 400 can be integrated with electronic circuitry, a microprocessor, memory, input-output (I/O) logic control, communication interfaces and components, other hardware, firmware, and/or software needed to run an entire device. The SoC 400 can also include an integrated data bus (not shown) that couples the various components of the SoC for data communication between the components. A data bus in the SoC can be implemented as any one or a combination of different bus structures, such as a memory bus or memory controller, an advanced system bus, a peripheral bus, a universal serial bus, and/or a processor or local bus that utilizes any of a variety of bus architectures. In addition, a device that includes SoC 400 can also be implemented with many combinations of differing components.

In this example, SoC 400 includes various components such as an input-output (I/O) logic control 402 (e.g., to include electronic circuitry, generally) and a microprocessor 404 (e.g., any of a microcontroller, digital signal processor, etc.). The SoC 400 also includes a memory 406, which can be any type of random access memory (RAM), a low-latency nonvolatile memory (e.g., flash memory), read only memory (ROM), and/or other suitable electronic data storage. The SoC 400 can also include various firmware and/or software, such as an operating system 408, which can be computer-executable instructions maintained by memory 406 and executed by microprocessor 404. The SoC 400 can also include other various communication interfaces and components, wireless LAN (WLAN) components, other hardware, firmware, and/or software.

In this example, SoC 400 may include OFDM modulator 118, OFDM demodulator 120, single-carrier modulator 122, and communication module 124 (e.g., for a high-power device). The SoC 400 may instead include OFDM modulator 120, single-carrier modulator 130, and communication module 124 (e.g., for a low-power device). Examples of these various components, functions, and/or modules, and their corresponding functionality, are described with reference to the respective components of the example environment 100 shown in FIG. 1.

The communication module in SoC 400, either independently or in combination, can be implemented as computer-executable instructions maintained by memory 406 and executed by microprocessor 404 to implement various embodiments and/or features of the tools. The communication module may also be provided as a service apart from SoC 400. Alternatively and/or in addition, the communication module and the other components (modulator(s) and/or demodulator(s)) can be implemented as hardware, firmware, fixed logic circuitry, or any combination thereof that is implemented in connection with the I/O logic control 402 and/or other signal processing and control circuits of SoC 400.

CONCLUSION

Current devices operating in a high frequency band (e.g., the 60 GHz band) often either use significant amounts of power or have implementation issues common to single-carrier modulation. This specification describes procedures and tools that enable lower power consumption and/or maximize channel utilization for devices communicating wirelessly in the 60 GHz range. These tools may include modulator(s), demodulator(s), and module(s) that enable handheld devices to use less power when communicating with wall-powered or other higher-powered devices while still enabling the wall-powered devices to communicate effectively with each other by maximizing channel utilization through various beamforming modulation schemes.

Although the subject matter has been described in language specific to structural features and/or methodological acts, it is to be understood that the subject matter defined in the appended claims is not necessarily limited to the specific features or acts described above. For example, one or more steps of procedures described above may be performed in a different order and still achieve desirable results. Moreover, the specific features and acts described above are disclosed as example forms of implementing the claims.

What is claimed is:

1. A method for transmitting and receiving 60 GHz band signals in a first wireless device, the method comprising:
    communicating with a second wireless device and a third wireless device using two communication modes, a first of the communication modes enabling communication with the second wireless device using single-carrier demodulation, a second of the communication modes enabling communication with the third wireless device using orthogonal frequency division multiplexing (OFDM) demodulation, neither of the communication modes using OFDM modulation, the communicating including:
        receiving, from the second wireless device and in the first communication mode, a 60 GHz band signal having been modulated in accordance with a single-carrier modulation scheme;
        receiving, from the third wireless device and in the second communication mode, a 60 GHz band signal having been modulated in accordance with an OFDM modulation scheme;
        in response to receiving the 60 GHz band signal having been modulated in accordance with the single-carrier modulation scheme, demodulating the 60 GHz band signal through a single-carrier demodulator of the first wireless device;
        in response to receiving the 60 GHz band signal having been modulated in accordance with the OFDM modulation scheme, demodulating the 60 GHz band signal through an OFDM demodulator of the first wireless device; and
        transmitting, from the first wireless device and in the second communication mode, a 60 GHz band signal to the third wireless device from which the 60 GHz band signal having been modulated in accordance with the OFDM modulation scheme is received, the 60 GHz band signal transmitted by the first wireless device modulated using a single-carrier modulator of the first wireless device and not an OFDM modulator, the first wireless device not including the OFDM modulator and not capable of modulating signals using the OFDM modulation scheme.

2. The method of claim 1, further comprising transmitting another 60 GHz band signal from the first wireless device to the second wireless device, the other 60 GHz band signal transmitted by the first wireless device modulated using the single-carrier modulator and not the OFDM modulator.

3. The method of claim 1, wherein the second wireless device is a low-power wireless device and the third wireless device is a high-power wireless device.

4. The method of claim 1, wherein the first wireless device comprises a personal digital assistant (PDA) or a cellular phone.

5. The method of claim 1, wherein the 60 GHz band signal transmitted by the first wireless device is modulated without performing a Fast Fourier Transform (FFT) operation.

6. The method of claim 1, wherein the wireless device comprises a Pico Network Controller (PNC).

7. A wireless device comprising:
a communication module configured to enable communication with other wireless devices using two communication modes, a first of the communication modes enabling communication with a first of the other wireless devices using single-carrier demodulation, a second of the communication modes enabling communication with a second of the other wireless devices using orthogonal frequency division multiplexing (OFDM) demodulation, neither of the communication modes using OFDM modulation, the communication module including:
a receiver to receive, from the first of the other wireless devices and in the first communication mode, a 60 GHz band signal having been modulated in accordance with a single-carrier modulation scheme and, from the second of the other wireless devices and in the second communication mode, a 60 GHz band signal having been modulated in accordance with an OFDM modulation scheme;
a single-carrier demodulator to demodulate the received 60 GHz band signal having been modulated in accordance with the single-carrier modulation scheme;
an OFDM demodulator to demodulate the received 60 GHz band signal having been modulated in accordance with the OFDM modulation scheme; and
a single-carrier modulator to modulate 60 GHz band signals to be transmitted from the wireless device to the first and the second of the other wireless devices in the respective communication modes, the wireless device not including an OFDM modulator that consumes more power than the single-carrier modulator and not capable of modulating signals in the 60 GHz band in accordance with the OFDM modulation scheme.

8. The wireless device of claim 7, wherein the 60 GHz signal to be transmitted is modulated without performing a Fast Fourier Transform (FFT) operation.

9. The wireless device of claim 7, wherein the 60 GHz band signal having been modulated in accordance with the single-carrier modulation scheme is received from a second wireless device and the 60 GHz band signal having been modulated in accordance with the OFDM modulation scheme is received from a third wireless device.

10. The wireless device of claim 9, wherein the 60 GHz band signals modulated using the single-carrier modulator are transmitted to the second and the third wireless device.

11. The wireless device of claim 7, wherein the wireless device comprises a personal digital assistant (PDA) or a cellular phone.

12. The wireless device of claim 7, wherein the single-carrier demodulator of the wireless device implements a Gaussian Frequency Shift Keying (GFSK) modulation scheme.

13. The wireless device of claim 12, wherein the wireless device comprises a Pico Network Controller (PNC).

14. A System-on-Chip (SoC) comprising:
a single-carrier demodulator configured to demodulate single-carrier-modulated 60 GHz band signals;
an orthogonal frequency division multiplexing (OFDM) demodulator configured to demodulate OFDM-modulated 60 GHz band signals;
a single-carrier modulator configured to modulate 60 GHz band signals prior to transmission, the SoC not capable of OFDM modulation of a 60 GHz band signal; and
a communication module to enable communication with wireless devices using two communication modes, a first of the communication modes enabling communication with a first wireless device using the single-carrier demodulator, a second of the communication modes enabling communication with a second wireless device using the OFDM demodulator, neither of the communication modes using OFDM modulation, the communication module configured to:
demodulate, using the single-carrier demodulator and in the first communication mode, a single-carrier-modulated 60 GHz band signal received from the first wireless device;
demodulate, using the OFDM demodulator and in the second communication mode, an OFDM-modulated 60 GHz band signal received from the second wireless device; and
modulate, using the single-carrier modulator and in the respective communication modes, 60 GHz band signals for transmission to the first wireless device and the second wireless device, the SoC not including an OFDM modulator.

15. The SoC of claim 14, wherein using the single-carrier modulator is effective to conserve power when responding to the second wireless device from which the OFDM-modulated 60 GHz band signal is received.

16. The SoC of claim 14, wherein the communication module is further configured to modulate the 60 GHz band signal without performing a Fast Fourier Transform (FFT) operation.

17. The SoC of claim 14, wherein the first wireless device is a low-power device and the second wireless device is a high-power wireless device.

18. The SoC of claim 14, wherein the SoC is embodied in a wireless phone, laptop computer, or personal digital assistant.

* * * * *